(12) United States Patent
Forstner

(10) Patent No.: US 12,647,518 B1
(45) Date of Patent: Jun. 2, 2026

(54) NO LOGIN TEXT RELAY CONVERSATIONS

(71) Applicant: Erik Thomas Forstner, Hudson, WI (US)

(72) Inventor: Erik Thomas Forstner, Hudson, WI (US)

( * ) Notice: Subject to any disclaimer, the term of this patent is extended or adjusted under 35 U.S.C. 154(b) by 206 days.

(21) Appl. No.: 18/785,928

(22) Filed: Jul. 26, 2024

Related U.S. Application Data

(60) Provisional application No. 63/528,916, filed on Jul. 26, 2023.

(51) Int. Cl.
| | |
|---|---|
| *H04M 3/00* | (2024.01) |
| *G06Q 10/107* | (2023.01) |
| *H04M 3/523* | (2006.01) |

(52) U.S. Cl.
CPC ........ *H04M 3/5233* (2013.01); *G06Q 10/107* (2013.01)

(58) Field of Classification Search
CPC ........................... H04M 3/5233; G06Q 10/107
USPC ....... 379/265.01–265.14, 266.01–266.1, 309
See application file for complete search history.

(56) References Cited

U.S. PATENT DOCUMENTS

| | | | | |
|---|---|---|---|---|
| 7,424,442 B2 * | 9/2008 | Wong | ................. | G06Q 30/0277 379/112.01 |
| 8,463,284 B2 * | 6/2013 | Morin | ..................... | H04W 4/18 455/466 |

| | | | | |
|---|---|---|---|---|
| 9,479,644 B1 * | 10/2016 | Varman | ............. | H04M 3/42008 |
| 9,532,197 B1 * | 12/2016 | Lew | ......................... | H04W 4/14 |
| 2011/0313804 A1 * | 12/2011 | Camp | .............. | G06Q 10/06311 705/26.1 |
| 2014/0162684 A1 * | 6/2014 | Shaw | .................... | H04W 4/029 455/456.1 |
| 2025/0016262 A1 * | 1/2025 | Spindler | ........... | H04M 1/72445 |
| 2025/0379933 A1 * | 12/2025 | Rathod | ............. | H04M 1/72436 |

\* cited by examiner

*Primary Examiner* — William J Deane, Jr.
(74) *Attorney, Agent, or Firm* — Johnson and Phung; Thomas N. Phung

(57) ABSTRACT

A login-free business text relay system that includes a business mainframe housing specific business information data processing capabilities, programming rules, programming methods and business staffs' contact information including business staffs' cell phone numbers and a business website displaying a lead user interface requesting the website visitor's information including connection information to a website visitor's cell phone, the lead user interface facilitating a connection between the website visitor, a business server, the business mainframe system, a correct business staff's cell phone and the website visitor's cell phone in the system, the business server automatically assigning and connecting a server phone number to the website visitor's cell phone and to the correct business staff's cell phone without the correct business staff having to log into the system to facilitate and monitor the text communication between the website visitor's cell phone and the business staff's cell phone.

20 Claims, 2 Drawing Sheets

(CONNECTION)

FIG. 1

(CONNECTION)

Fig. 2

(COMMUNICATION)

USER
(CUSTOMER)
CELL PHONE

*14*

SERVER

*12*

EMPLOYEE
CELL PHONE

*15*

BUSINESS
MAIN FRAME

*13*

NO LOGIN TEXT RELAY CONVERSATIONS

CROSS-REFERENCE TO RELATED APPLICATIONS

This application claims priority to provisional patent application Ser. No. 63/528,916; filed on Jul. 26, 2023; titled NO LOGIN TEXT RELAY CONVERSATIONS.

FIELD OF THE INVENTION

This invention relates generally to online chat systems and, more specifically to an online chat system that includes a method, a system, and a server to process and assign a server phone number, which acts to facilitate the sending of text messages between two parties in a live texting conversation on the text messaging apps of both parties' cell phone.

STATEMENT REGARDING FEDERALLY SPONSORED RESEARCH OR DEVELOPMENT

None

REFERENCE TO A MICROFICHE APPENDIX

None

BACKGROUND OF THE INVENTION

Currently, chat and Short Message Service (SMS) text conversation systems are utilized by businesses to allow an interested party to communicate with the businesses, take the data inputted by an interested party and pass that data to a software system. In order for the business to respond to the conversation, a business staff must use credentials to log in to the software system and respond to the interested party using the software's internal messaging tools which take the business inputted data and transmits it to the interested party in the same form which they imitated their conversation in.

The online chat system of the present invention eliminates the need for business staffs to log in to any software system to respond to customer-initiated inquiries as the software and system processes the inquiry data and assigns a single server phone number to both the user who initiated the conversation and the business employee. The single server phone number acts as a relay between the user and the business owner establishing real-time text message conversations where the data is still stored and processed in a system.

SUMMARY OF THE INVENTION

Briefly, the present invention comprises a login-free business text relay system that includes a business mainframe that houses specific business information data processing capabilities, programming rules, programming methods and business staffs' contact information including business staffs' cell phone numbers and a business website displaying a lead user interface containing a unique business identifier for a corresponding business, the lead user interface requesting the website visitor's information including connection information to the website visitor's cell phone, the lead user interface facilitating a connection between the website visitor, a business server, the business mainframe system, a correct business staff's cell phone and the website visitor's cell phone in the system, the business server automatically assigning and connecting a server phone number to the website visitor's cell phone and to the correct business staff's cell phone without the correct business staff having to log into the system to facilitate and monitor a SMS text communication between the website visitor's cell phone and the business staff's cell phone.

The present invention also comprises a method of real-time engagement for text message communication between businesses and website visitors that does not require business staffs to log into a business mainframe to communicate with the website visitor that includes the steps of displaying a lead user interface code on a business website that requests a website visitor's information including connection information to the website visitor's cell phone to a business website, sending data containing the website visitor's information to a business server that creates a business server-assigned phone number to the website visitor's cell phone number, forwarding the data from the business server to the business mainframe to process the data and identify and assign the data to a corresponding business in the business mainframe based on a unique business identifier, assigning a corresponding business staff to the data by the business mainframe, sending the data back from the business mainframe to the business server via an Application Programming Interface, and sending a text about the business and the business staff from the business server to the website visitor while also sending a text using the business server-assigned phone number to a cell phone of the business staff assigned to the website visitor with the website visitor initiating a correspondence to the business server-assigned phone to enable a text conversation between the website visitor and the business staff facilitated by the business server-assigned phone number and the cell phones of the website visitor and the business staff in a single thread on their devices.

BRIEF DESCRIPTION OF THE DRAWINGS

FIG. 1 is a diagram view showing an embodiment of an online login-free business text relay system of the present invention; and FIG. 2 a diagram view showing the communication process for the online login-free business text relay system of FIG. 1.

DESCRIPTION OF THE PREFERRED EMBODIMENT

The general purpose of the present invention, which will be described subsequently in greater detail, is directed to an online login-free chat system that allows a user to initiate a live two-way text-based conversation with a business where a single server number is assigned to both the user and the business, and a server processes and stores all data relating to the text message conversation that the two parties send to the single server phone number.

A feature of the present invention is that the online chat system allows businesses to have their website visitors and employees engage with each other via SMS Text without either party having to log in to additional systems, all the while the server and system are processing and storing the texts sent securely.

There have thus been outlined the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the disclosing subject matter be regarded as including such equivalent constructions insofar as they do not depart from the spirit and scope of the present invention.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

In addition, the accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of any potential claims.

Figure 1:
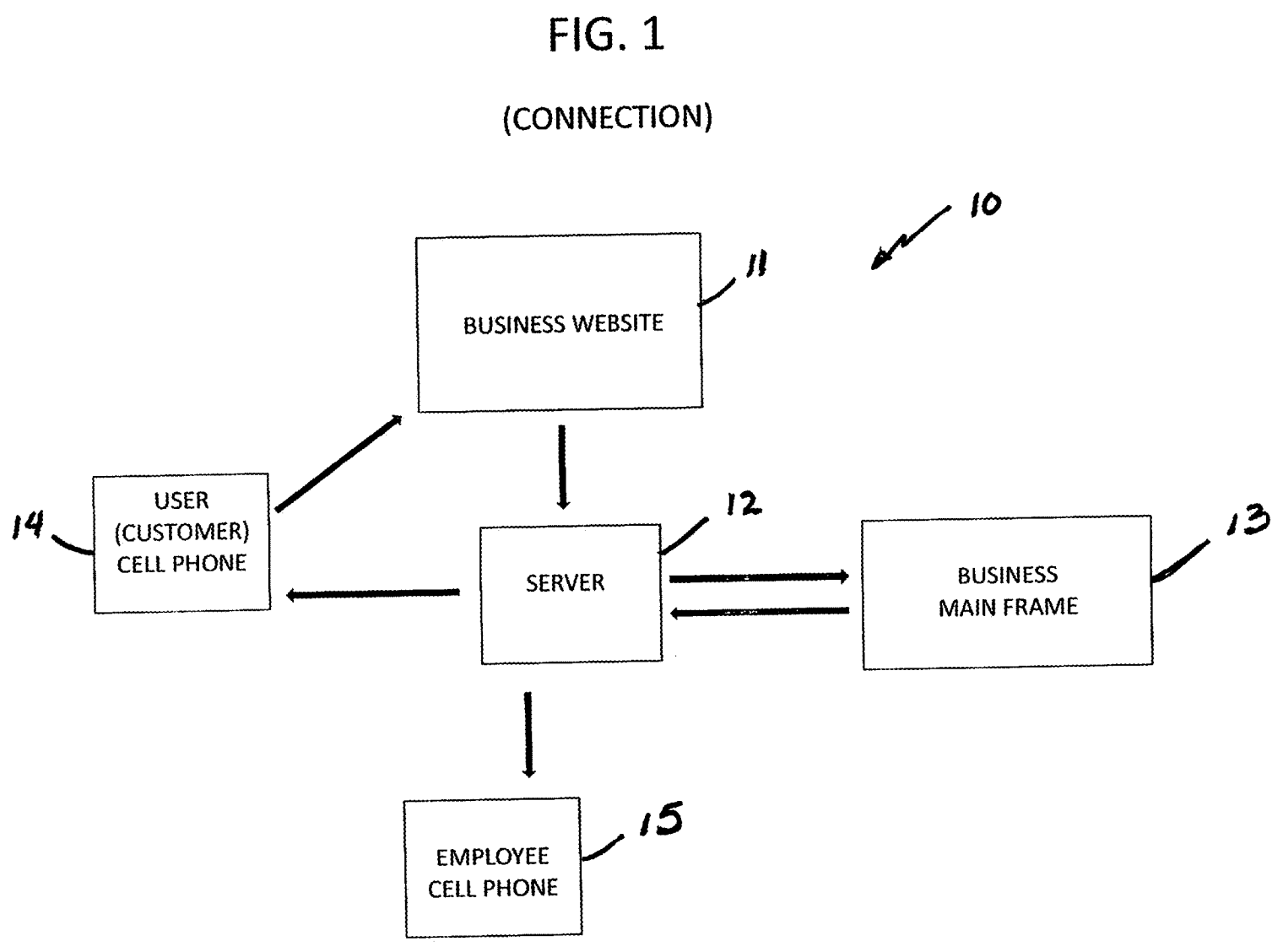

Referring to the drawing, FIG. 1 is a diagram view showing an embodiment of an online login-free business text relay system 10 of the present invention which generally includes a business website 11, business server 12, and a business mainframe 13 that houses specific business information data processing capabilities, programming rules, programming methods and business staffs' contact information including business staffs' cell phone numbers.

The business website 11 includes a Lead User Interface, preferable a html code, containing a business server generated unique business identifier for a corresponding business that is displayed on the business website 11. The Lead User Interface functions to request a customer or website visitor on the business website 11 to submit data containing the website visitor's information including connection information to a website visitor's cell phone 14 to the lead user interface.

The Lead User Interface then facilitates a connection between the website visitor, the business server 12, the business mainframe 13, a correct business staff's cell phone 15 and the website visitor's cell phone 14 in the system 10 by the business server 12 first automatically assigning and connecting a server phone number to the website visitor's cell phone 14 and to the correct business staff's cell phone 15 without the correct business staff having to log into the system 10 to facilitate and monitor a SMS text communication between the website visitor's cell phone and the business staff's cell phone.

Although the text communication between the website visitor's cell phone 14 and the business staff's cell phone 15 may be through various types of apps, in the embodiment of FIG. 1, the SMS text communication between the website visitor's cell phone 14 and the business staff's cell phone 15 is preferable through their cell phone's native messaging apps.

The online login-free business text relay system 10 starts with a System Set-Up which generally includes a business initially creating a profile in the online login-free business text relay system 10, which may include the creation of a user profile that is password protected along with associated businesses profile.

Upon the business profile being successfully created and entered into the system 10, the system 10 automatically generates a unique business identifier. The unique business identifier is then inserted into a HTML script for the Lead User Interface (UI) that connects the business website 11 to the business server 12 and the business main frame 13 through an Application Programming Interface (API). The business preferably then inserts the HTML code complete with the unique Dealer ID into the business' website code, so the Lead User Interface is visible to visitors of the business website 11.

Figure 2:
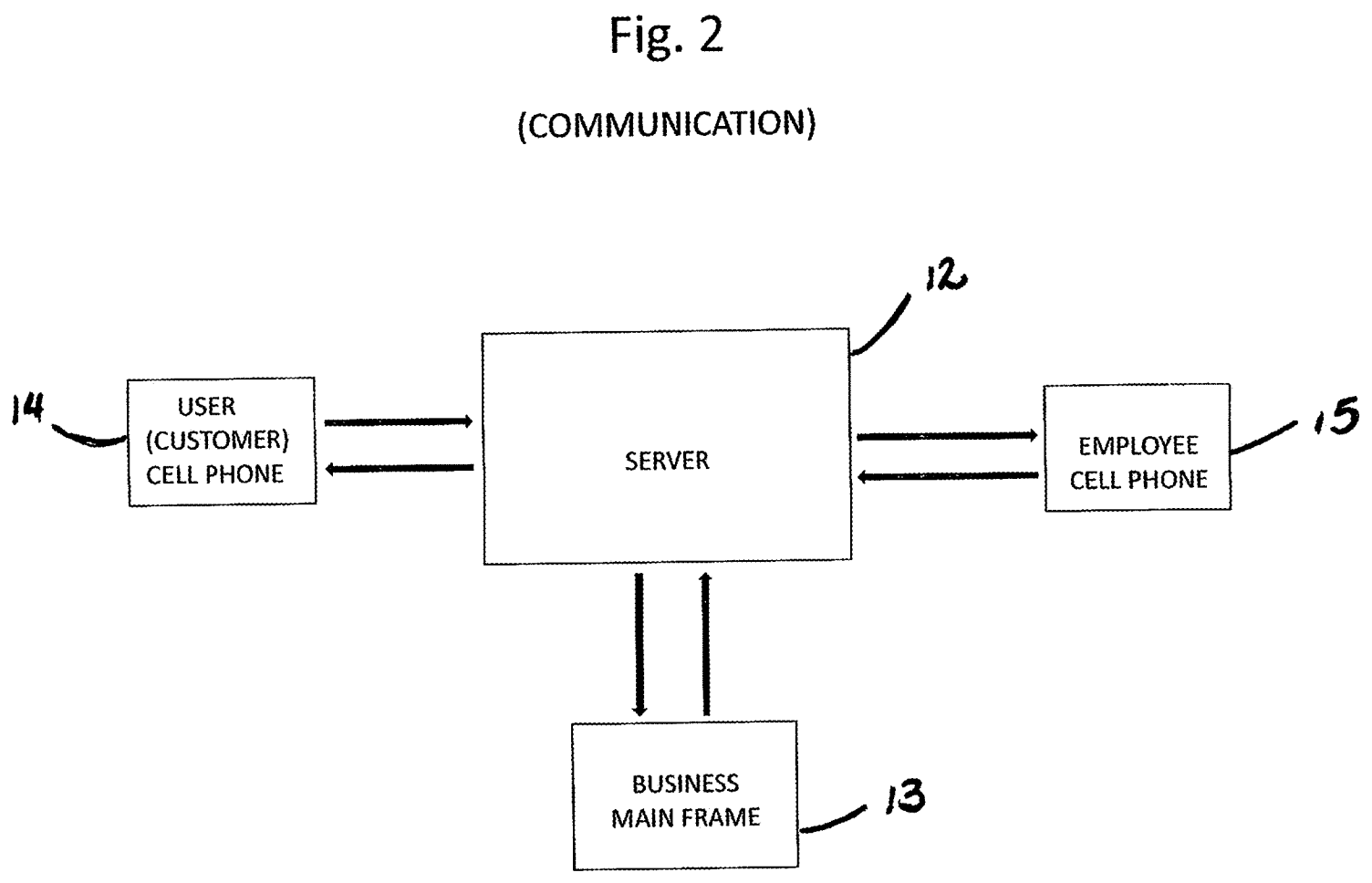

FIG. 2 is a diagram view showing the communication process for the online login-free business text relay system 10 of FIG. 1. In the operation of the online login-free business text relay system 10 the website code inserted on the business website 11 powers the Lead User Interface so that when the Lead User Interface is filled out correctly with data including the connection information of the website visitor's cell phone 14, the HTML script sends the data to the business server 12.

The business server 12 then assigns a business server-assigned phone number to the connection information of the website visitor's cell phone 14.

The business server 12 then passes all data to the business main frame 13, which processes the data, identifies and assigns the data to a pertinent and corresponding business in the system 10 based on the unique business identifier of the pertinent and corresponding business.

After assigning the data to the pertinent and corresponding business in the system 10, the system 10 then looks at the business rules and employees that are in the system and associated with the pertinent and corresponding business and assigns the next available or willing business staff to the data. After assigning the pertinent and corresponding business and the business staff to the data, the system 10 via the business main frame 13 then sends the aforementioned data back to the business server 12 via the Application Programming Interface (API).

The business server 12 then sends out a SMS text about the business and the business staff to the website visitor's cell phone 14 while at the same time, the business server 12 sends out a SMS text using the business server-assigned number to a business staff's cell phone 15 that is assigned to the website visitor. The website visitor then initiates the correspondence via the business server-assigned phone number at which point, both the website visitor who initiated the correspondence and the assigned business staff are able to text the business server-assigned phone number from their corresponding cell phones 14, 15 in a single thread on their devices.

During the text conversation between the website visitor and the business staff, when either the website visitor or the business user texts the business server-assigned phone number, the text is sent to the business server, which sends the text to the business main frame 13 for processing. The business main frame 13 then stores the data and sends the data back to the business server 12 to be sent by text using the business server number to the corresponding user in the text conversation. The business server 12 or the business mainframe 15 may also automatically save text data between the website visitor's cell phone and the business staff's cell phone at the conclusion of their conversation.

During the text conversation between the website visitor and the business staff, the system 10 may also be accessed by a credential business personnel such as a business supervisor or a business manager to join in on the text conversation between the website visitor and the business staff from an integrated messaging platform of the mainframe 13 to the business server 12.

A feature of system 10 is that when a business is entered into the system 10, the business is preferably required to enter at least one manager's cell phone number and an email address to receive completed conversations between the website visitor and the business staff.

When conversation between the website visitor and the business staff are ended either by users or the system rules, the system 10 may also include the feature of the system 10 triggering two additional actions, namely (a) the system 10 sending an HMTL link to the business server as well as a text to the manager's cell phone number of a summary of the communication between the business user and the website visitor and (b) the system 10 sending an email directly to a business email in the businesses profile that contains the contents and messages between the website visitor and the business user.

In summary, some of the features of the online login-free business text relay system 10 of the present invention include but are not limited to (1) providing a new real-time engagement method, business server 12, and system 10 for Text Message Communication between businesses and website visitors that do not require business personnel to log in to the system 10 in order to communicate with the website visitor while securely processing and housing all data sent between both parties; (2) providing a business server 12 and business main frame 13 that allows website users and business users to communicate securely with each other from their cell phone's native messaging apps while passing the data through a business server and system for appropriate storage and processing; (3) providing a website HTML code that displays a Lead User Interface that when completed by a website visitor facilitates the connection between the website visitor, the business server 12, the business main frame 13, and the correct business and a user in the system 10; (4) providing a business server 12 that automatically assigns a business server-assigned phone number to website visitors that request to communicate with a business via the Lead User Interface; (5) providing a system 10 that houses specific business information data processing capabilities, programming rules and methods, and business employee cell phone numbers and relevant data; (6) providing a method in which the HTML Lead User Interface, the business server 12, and the business main frame 13 all work cohesively to relay text communications from a website visitor to a business user without the business user needing to log into the system 10; (7) providing a system 10 that has integrated messaging capabilities that utilize the business server 12 to send data to website visitors in addition to the business staff's cell phones 15; (8) providing a system 10 that ensures conversations are completed between a business staff and the website user and communicates with the business server 12 to text the business management cell phone the contents of the text communications for accountability reasons; (9) providing a system 10 that at the conclusion of a text conversation between the business user and website visitor, automatically sends an email to the business email on file in the business profile for accountability; and (10) providing a system 10 that securely houses all past conversations between website users and business staffs that can be accessed and reactivated by business management with login credentials to the system.

The present invention also includes a method of real-time engagement for text message communication between businesses and website visitors that does not require business staffs to log into a business mainframe 13 to communicate with the website visitor including the steps of (1) displaying a lead user interface code on a business website 11 that requests a website visitor's information including connection information to the website visitor's cell phone 14 to a business website 11; (2) sending a data containing the website visitor's information to a business server 12 that creates a business server-assigned phone number to the website visitor's cell phone number; (3) forwarding the data from the business server 12 to the business mainframe 13 to process the data and identify and assign the data to a corresponding business in the business mainframe 13 based on a unique business identifier; (4) assigning a corresponding business staff to the data by the business mainframe 13; (5) sending the data back from the business mainframe 13 to the business server 12 via an Application Programming Interface; and (6) sending a text about the business and the business staff from the business server 12 to the website visitor while also sending a text using the business server-assigned phone number to a cell phone of the business staff assigned to the website visitor with the website visitor initiating a correspondence to the business server-assigned phone to enable a text conversation between the website visitor and the business staff facilitated by the business server-assigned phone number and the cell phones of the website visitor and the business staff in a single thread on their devices.

The above method may also include the steps of (7) accessing the mainframe 13 by a personnel of the corresponding business with access credentials, and the personnel of the corresponding business with access credentials joining in on the text conversation between the website visitor and the business staff from an integrated messaging platform of the mainframe 13 to the business server 12, which will send the data to the website visitor via text from the business server phone number; (8) forwarding a completed conversation between the website visitor and the business staff to a business manager's cell phone number or email address; (9) sending an HMTL link containing a summary of the communication between the website visitor and the business staff to the business server 12 as well as the business manager's cell phone number or email address manager; (10) sending an email directly to a business email in a business' profile that contains the contents and messages between the website visitor and the business staff and the business staff; and (11) creating a business profile in an online business chat system and obtaining a unique business identifier for forming the Lead user interface that is displayed on the business website 11.

I claim:

1. A login-free business text relay system comprising:

a business mainframe that houses specific business information data processing capabilities, programming rules, programming methods and business staffs' contact information including business staffs' cell phone numbers; and a business website displaying a lead user interface requesting the website visitor's information including connection information to a website visitor's cell phone, the lead user interface facilitating a connection between the website visitor, a business server, the business mainframe system, a correct business staff's cell phone and the website visitor's cell phone in the system, the business server automatically assigning and connecting a server phone number to the website visitor's cell phone and to the correct business staff's cell phone without the correct business staff having to log into the system to facilitate and monitor the text communication between the website visitor's cell phone and the business staff's cell phone.

2. The system of claim 1 wherein the business mainframe automatically sends an accountability email to a business email on file after a text conversation between the website visitor and the business staff.

3. The system of claim 1 wherein all past conversations between the website visitor and the business staff through the business mainframe is accessible through the system.

4. The system of claim 1 wherein the lead user interface comprises a html code.

5. The system of claim 1 wherein text communication between the website visitor's cell phone and the business staff's cell phone is through their cell phone's native messaging apps.

6. The system of claim 1 wherein the business server and the business mainframe automatically save text data between the website visitor's cell phone and the business staff's cell phone at the conclusion of their conversation.

7. The system of claim 1 wherein the business mainframe sends an HMTL link to the server and a text to a cell phone number of a business manager each containing a summary of the communication between the business user and the website visitor.

8. The system of claim 1 wherein the lead user interface includes a unique business identifier generated for a corresponding business.

9. A login-free business text relay system comprising:

a business mainframe that houses specific business information data processing capabilities, programming rules, programming methods and business staffs' contact information including business staffs' cell phone numbers; and a business website displaying a lead user interface containing a unique business identifier for a corresponding business, the lead user interface requesting the website visitor's information including connection information to a website visitor's cell phone, the lead user interface facilitating a connection between the website visitor, a business server, the business mainframe system, a correct business staff's cell phone and the website visitor's cell phone in the system, the business server automatically assigning and connecting a server phone number to the website visitor's cell phone and to the correct business staff's cell phone without the correct business staff having to log into the system to facilitate and monitor a SMS text communication between the website visitor's cell phone and the business staff's cell phone.

10. The system of claim 9 wherein the lead user interface comprises a html code.

11. The system of claim 10 wherein the SMS text communication between the website visitor's cell phone and the business staff's cell phone is through their cell phone's native messaging apps.

12. The system of claim 11 wherein the business server and the business mainframe automatically save text data between the website visitor's cell phone and the business staff's cell phone at the conclusion of their conversation.

13. The system of claim 12 wherein the business mainframe automatically sends an accountability email to a business email on file after the SMS text conversation between the website visitor and the business staff.

14. The system of claim 13 including an HMTL link containing a summary of the communication between the business user and the website visitor is sent by the business mainframe to the business server and a SMS text containing the summary of the communication between the business user and the website visitor is sent by the business mainframe to a business manager.

15. A method of real-time engagement for text message communication between businesses and website visitors that does not require business staffs to log into a business mainframe to communicate with the website visitor comprising the steps of:

displaying a lead user interface code on a business website that requests a website visitor's information including connection information to the website visitor's cell phone to a business website;

sending data containing the website visitor's information to a business server that creates a business server-assigned phone number to the website visitor's cell phone number;

forwarding the data from the business server to the business mainframe to process the data and identify and assign the data to a corresponding business in the business mainframe based on a unique business identifier;

assigning a corresponding business staff to the data by the business mainframe;

sending the data back from the business mainframe to the business server via an Application Programming Interface; and sending a text about the business and the business staff from the business server to the website visitor while also sending a text using the business server-assigned phone number to a cell phone of the business staff assigned to the website visitor with the website visitor initiating a correspondence to the business server-assigned phone to enable a text conversation between the website visitor and the business staff facilitated by the business server-assigned phone number and the cell phones of the website visitor and the business staff in a single thread on their devices.

16. The method of claim 15 including the step of accessing the mainframe by a personnel of the corresponding business with access credentials, and the personnel of the corresponding business with access credentials joining in on the text conversation between the website visitor and the business staff from an integrated messaging platform of the mainframe to the business server, which will send the data to the website visitor via text from the business server phone number.

17. The method of claim 16 including the step of forwarding a completed conversation between the website visitor and the business staff to a business manager's cell phone number or email address.

18. The method of claim 17 including the step of sending an HMTL link containing a summary of the communication between the website visitor and the business staff to the business server as well as the business manager's cell phone number or email address manager.

19. The method of claim 18 including the step of sending an email directly to a business email in a business' profile that contains the contents and messages between the website visitor and the business staff and the business staff.

20. The method of claim 19 including the step of creating a business profile in an online business chat system and obtaining a unique business identifier for forming the Lead user interface that is displayed on the business website.

\* \* \* \* \*